United States Patent [19]
Hung

[11] Patent Number: 5,501,302
[45] Date of Patent: Mar. 26, 1996

[54] HANGING APPARATUS FOR BRAKE CORD OF A BICYCLE

[76] Inventor: Yuh-Jou Hung, No.16, Wei Hsin chuang, Shih Pai Li, Changhua City, Taiwan

[21] Appl. No.: 506,212

[22] Filed: Jul. 24, 1995

[51] Int. Cl.⁶ .................................................. B62L 3/00
[52] U.S. Cl. .................... 188/24.21; 188/196 M
[58] Field of Search .................... 188/24.19, 24.21, 188/24.12, 196 M; 74/501.5 R, 502.6, 586, 500.5

[56] References Cited

U.S. PATENT DOCUMENTS

| | | | |
|---|---|---|---|
| 4,552,251 | 11/1985 | Schoch | 188/24.21 |
| 4,842,102 | 6/1989 | Tateyama | 188/24.21 |
| 5,060,534 | 10/1991 | Yoshigai | 188/24.21 |
| 5,215,167 | 6/1993 | Davidson | 188/24.21 |
| 5,431,256 | 7/1995 | Wen | 188/24.21 |

*Primary Examiner*—Robert J. Oberleitner
*Assistant Examiner*—C. T. Bartz
*Attorney, Agent, or Firm*—Bacon & Thomas

[57] ABSTRACT

A hanging apparatus for brake cord of a bicycle. The brake cord is securely connected with the hanging apparatus and two hanging cords are connected between the hanging apparatus and two brake blocks. The brake cord is able to pull the hanging apparatus to synchronously pull the hanging cords so as to drive the brake blocks for braking. The hanging apparatus includes two circular metal plates, a seat member receiving the metal plates and a cover member overlaid on the seat member to clamp the metal plates and two hanging heads of the hanging cords. A stepped bolt is passed through the seat member, the metal plates and the cover member to be tightened by a nut for pulling the brake cord. The seat member and cover member are engaged with each other to compress a circular socket defined by the metal plates and bind the brake cord therein without loosening therefrom. When braking, the hanging cords are sufficiently swingable within a left and a right notches of the seat member and cover member without being tensioned. The hanging cords are securely hung on the hanging apparatus without departing therefrom.

1 Claim, 6 Drawing Sheets

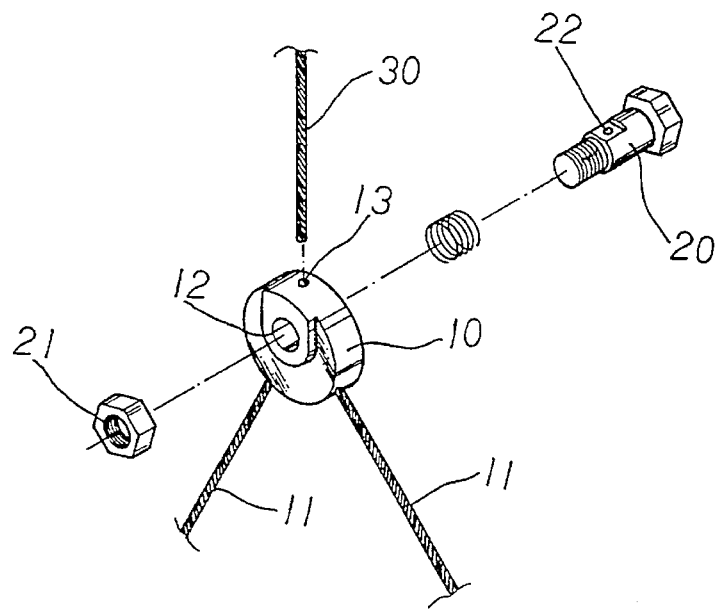
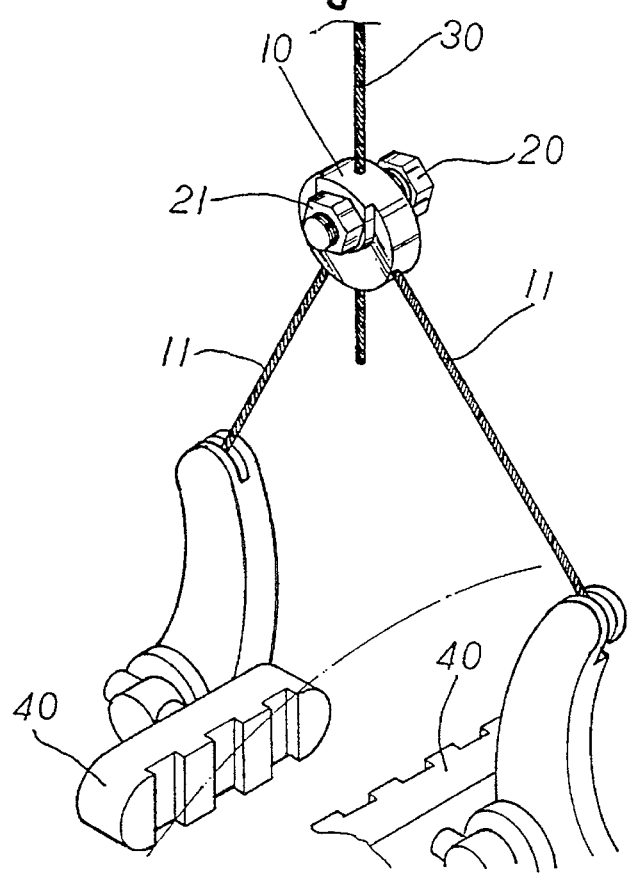
Fig. 1
Fig. 2

HANGING APPARATUS FOR BRAKE CORD OF A BICYCLE

BACKGROUND OF THE INVENTION

The present invention relates to a hanging apparatus for brake cord of a bicycle. The brake cord is securely connected with the, hanging apparatus and two hanging cords are connected between the hanging apparatus and two brake blocks. The brake cord is able to pull the hanging apparatus to synchronously pull the hanging cords so as to drive the brake blocks for braking. The hanging apparatus includes two circular metal plates, a seat member receiving the metal plates and a cover member overlaid on the seat member to clamp the metal plates and two hanging heads of the hanging cords. A stepped bolt is passed through the seat member, the metal plates and the cover member to be tightened by a nut for pulling the brake cord. The seat member and cover member are engaged with each other to compress a circular socket defined by the metal plates and bind the brake cord therein without loosening therefrom. When braking, the hanging cords are sufficiently swingable within a left and a right notches of the seat member and cover member without being tensioned.

FIG. 1 shows a conventional hanging member 10 for brake cord of a bicycle, wherein the hanging member 10 is integrally formed as a circular block. The heads of two hanging cords 11 are fixed in the hanging member 10. The hanging member 10 is formed with a bolt hole 12 for a bolt 20 to pass therethrough to Be tightened by a nut 21. The hanging member 10 is further formed with a longitudinal brake Cord hole 13 and the bolt 20 is formed with a through hole 22 in alignment with the brake cord hole 13, whereby a brake cord 30 and pass therethrough to be fixed by means of the tightened bolt 20 and nut 21. The lower ends of the hanging cords 11 are associated with a brake block assembly 40 as shown fin FIG. 2.

According to the above arrangements, the hanging cords 11 are fixedly mounted in the hanging member 10 so that when pulling the brake cord 30, the hanging cords 11 are curved and tensioned as shown in FIG. 3. In addition, the adjoining points of the hanging cords 11 in the hanging member 10 suffer considerably large force and are apt to break down after a period of use. Moreover, the brake cord 30 is only weakly pulled and fixed by means of the bolt 20 and apt to depart from the hanging member 10 as shown in FIG. 4.

SUMMARY OF THE INVENTION

It is therefore a primary object of the present invention to provide a hanging apparatus for brake cord of a bicycle. The brake cord is securely connected with the hanging apparatus and two hanging cords are connected between the hanging apparatus and two brake blocks. The hanging apparatus includes two circular metal plates, a seat member receiving the metal plates and a cover member overlaid on the seat member to clamp the metal plates and two hanging heads of the hanging cords. A Stepped bolt is passed through the seat member, the metal plates and the cover member to be tightened by a nut for pulling the brake cord. The seat member and cover member are engaged with each other to-compress a circular socket defined by the metal plates. Therefore, the brake cord is binded not only by the bolt, but also by the metal plates without departing therefrom.

It is a further object of the present invention to provide the above hanging apparatus, wherein when the brake cord is pulled to drive the hanging cords and make the brake blocks move toward each other, the hanging cords are sufficiently swingable within a left and a right notches defined by the seat member and the cover member without being tensioned. Therefore, the adjoining points of the hanging cords suffer less force and are more firmly and durably mounted in the hanging apparatus without breaking down and departing therefrom.

The present invention can be best understood through the following description and accompanying drawings, wherein:

BRIEF DESCRIPTION OF THE DRAWINGS

FIG. 1 is a perspective exploded view of a conventional hanging member for brake cord of a bicycle;

FIG. 2 is a perspective assembled view of the conventional hanging member according to FIG. 1;

DETAILED DESCRIPTION OF THE PREFERRED EMBODIMENT

Figure 3:
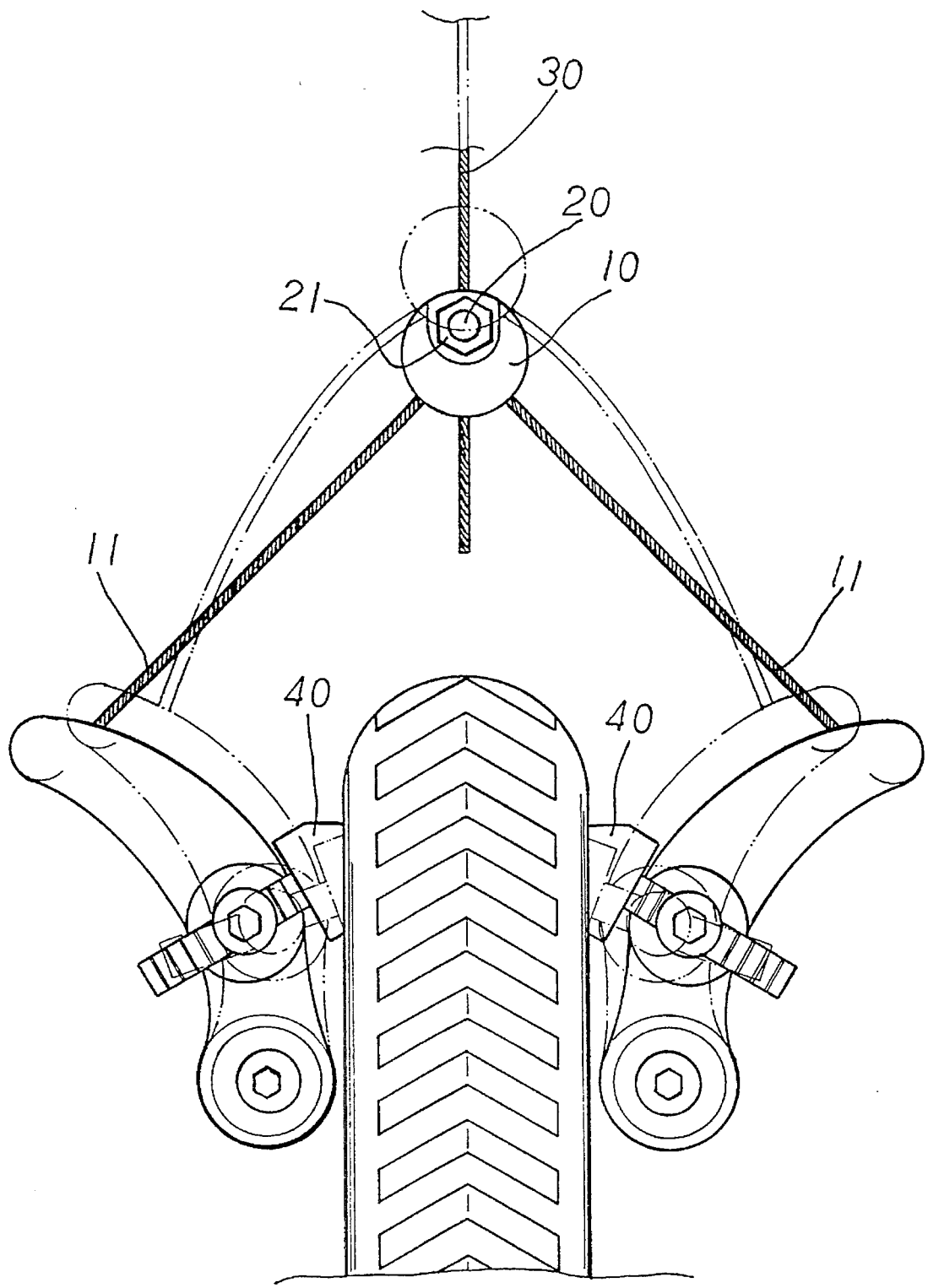
FIG. 3 shows that the brake cord of the conventional hanging member is pulled to drive the hanging cords and the brake blocks.
Figure 4:
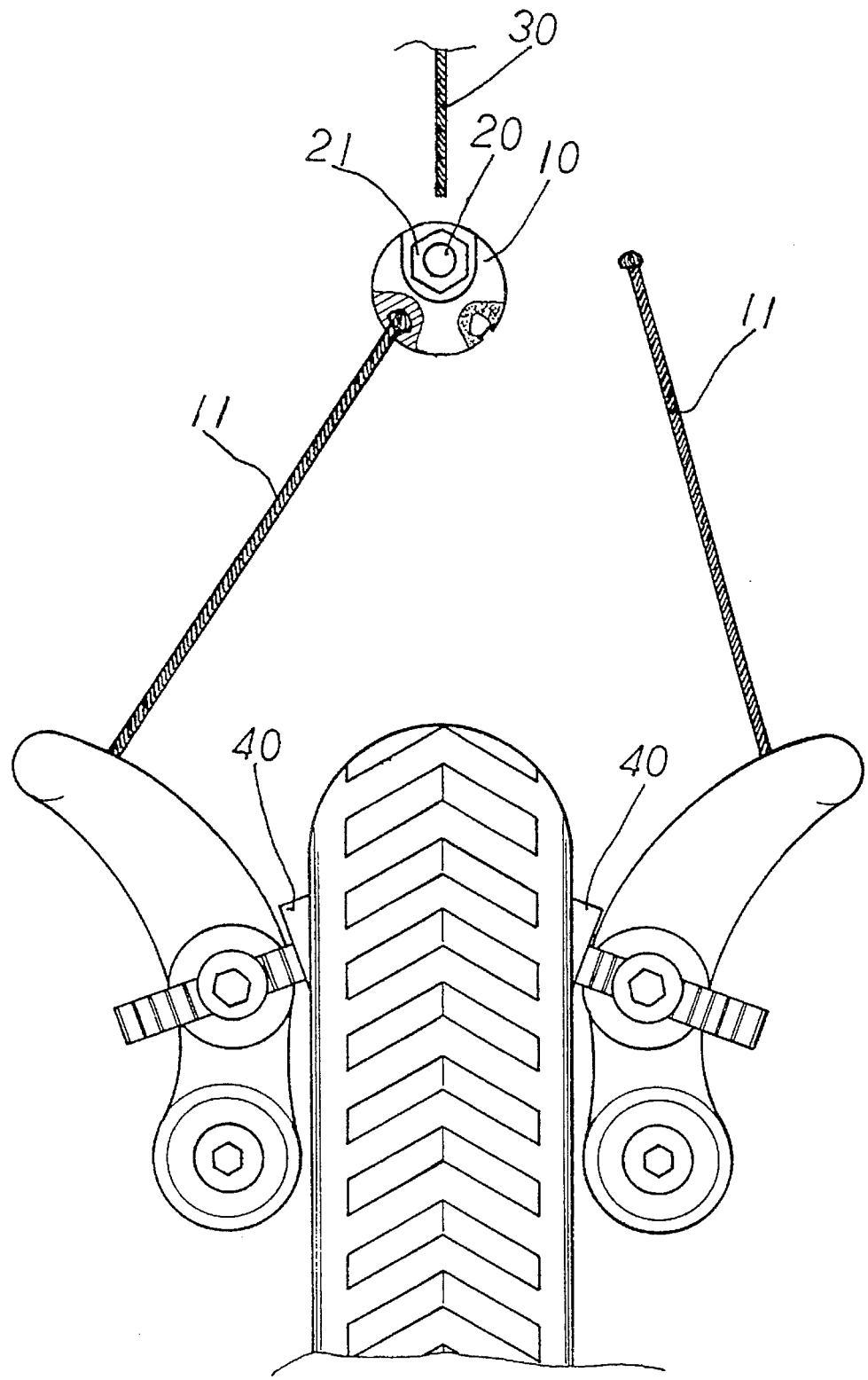
FIG. 4 shows that the adjoining points of the hanging cords of the conventional, hanging member is detached therefrom.
Figure 5:
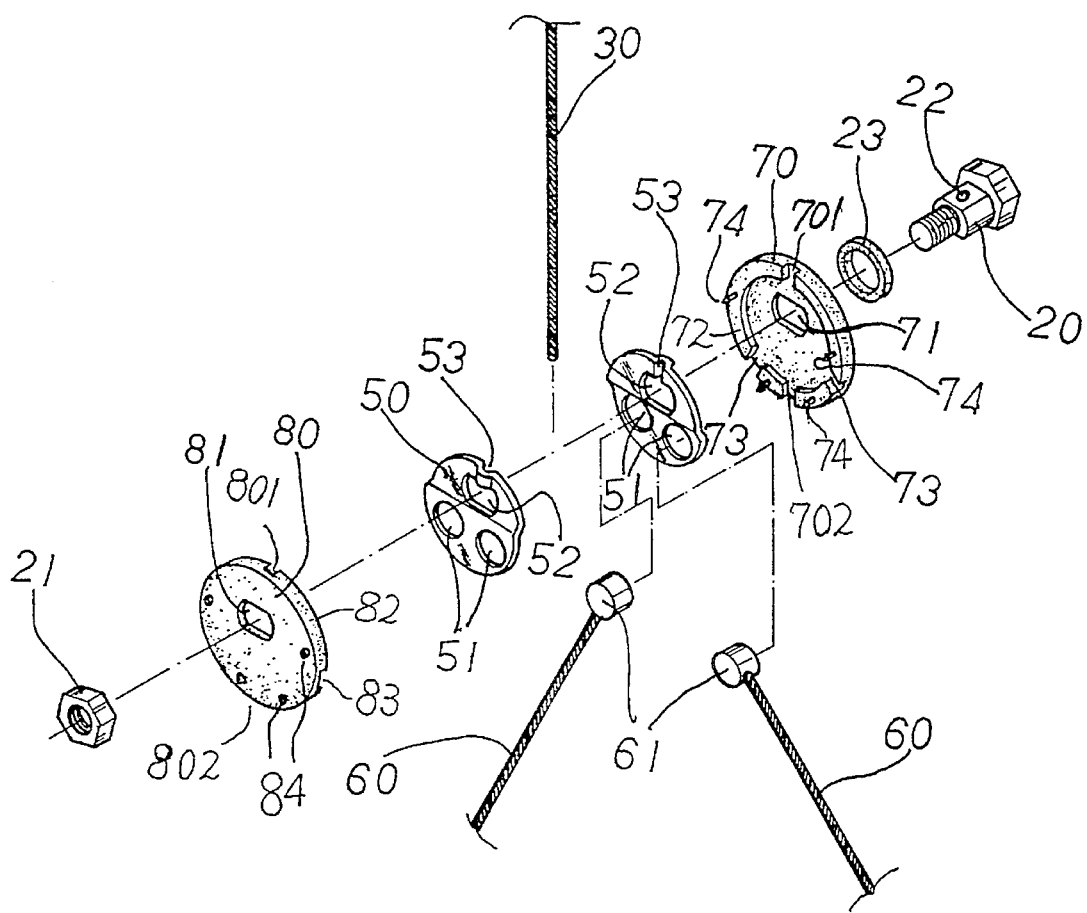
FIG. 5 is a perspective exploded view of the hanging apparatus of the present invention.
Figure 6:
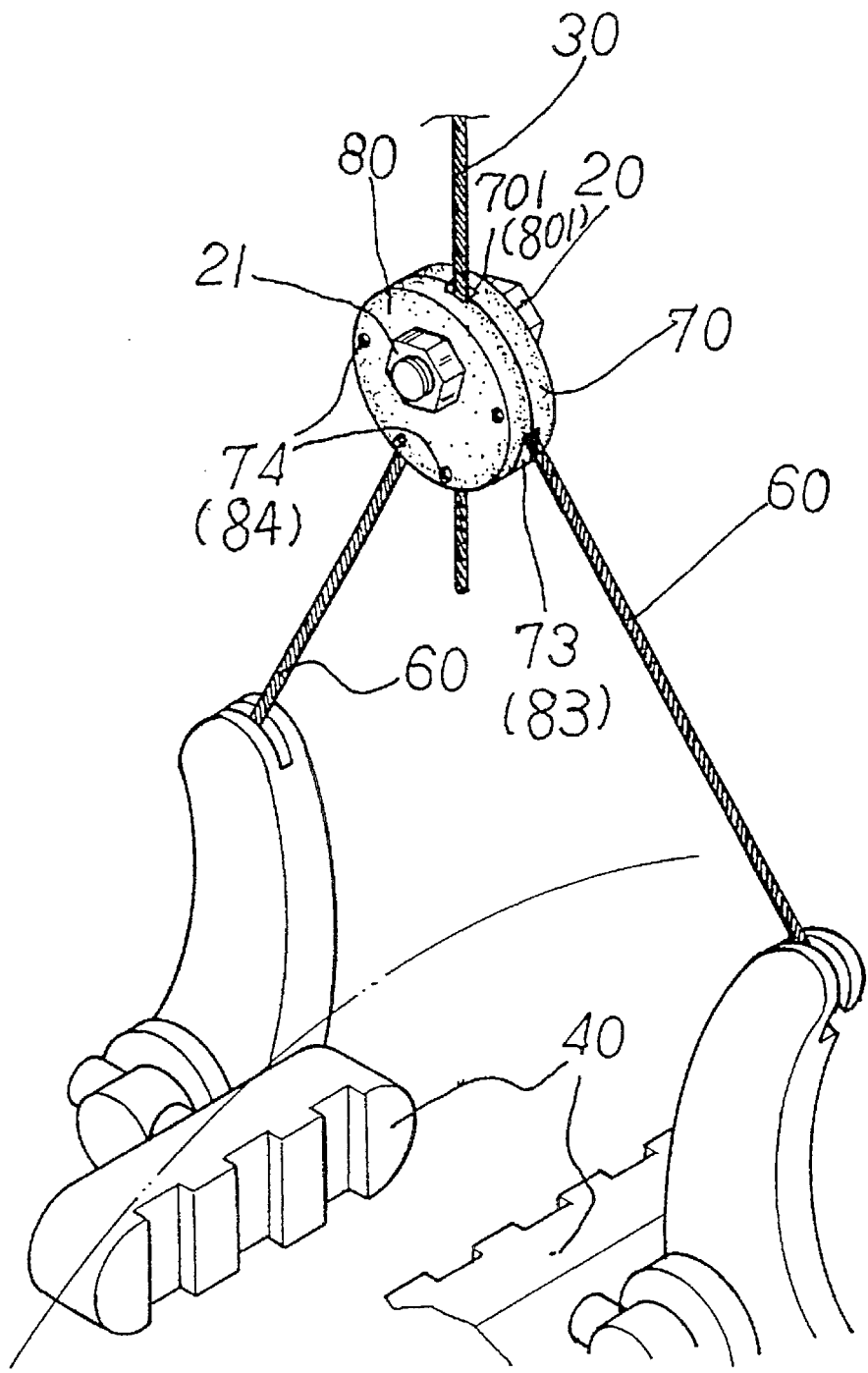
FIG. 6 is a perspective assembled view of the present invention.

Please refer to FIG. 5. The present invention includes two circular metal plates 50 each having a middle bent section, a lower section formed with two circular holes 51, and an upper section formed with an elliptic hole 52. The upper section of the metal plate 50 is also formed with a semicircular channel 53 above the elliptic hole 52, whereby when the two metal plates 50 are attached to each other, the channels 53 together form a circular socket having a diameter slightly smaller than that of a brake cord 30. Two hanging heads 61 of two hanging cords 60 are positioned in the circular holes 51 of the metal plates 50, whereby when the metal plates 50 are attached to each other, the hanging cords 60 are clamped therebetween. The metal plates 50 are placed in a seat member 70 formed with an elliptic hole 71 and a peripheral flange 72 disposed with an upper and a lower notches 701, 702 and a left and a right notches 73. The diameter of each notch is slightly larger than that of the hanging cord 60, whereby the hanging cord 60 can pass through the left and right notches 73 of the flange 72 of the seat member 70. A cover member 80 is then overlaid on the seat member 70. The cover member 80 is also formed with an elliptic hole 81 and a peripheral flange 82. The flange 82 is formed with an upper and a lower notches 801, 802 and a left and a right notches 83. Four engaging posts 74 are disposed on the flange 72 of the seat member 70, while four engaging orifices 84 are formed on the flange 82 of the cover member 80, whereby the engaging posts 74 can be inserted into the engaging orifices 84 so as to engage She cover member 80 with the seat member 70 and clamp the metal plates 50 and the hanging heads 61 therebetween with the hanging cords 60 passing through the notches 73, 83 of the seat member 70 and cover member 80. A stepped bolt 20 having an elliptic large diameter section and a threaded small diameter section is passed through a rubber washer 23, the elliptic holes 71, 52, 82 of the seat member 70, metal plates 50 and cover member 80. The threaded section of the bolt 20 is then tightened With a nut 21. A through hole 22 is formed on the large diameter section of the bolt 20 in alignment with the circular socket of the metal plates 50, whereby the brake cord 30 can pass through the upper notches 701, 801 of the seat member 70 and cover member 80, the circular socket of the metal plates 50, the through hole 22 of the bolt 20 and a clearance between the lower sections of the metal plates 50 and the lower notches 702, 802 of the seat member 70 and cover member 80. The bolt 20 is tightened by the nut 21 and thus is able to pull the brake cord 30. The seat member 70 and cover member 80 are engaged with each other to compress the circular socket of the metal plate and bind the brake cord 30 wherein without loosening therefrom. Two lower ends of the hanging cords 60 are connected with a brake block assembly 40 as shown in FIG. 6.

Figure 7:
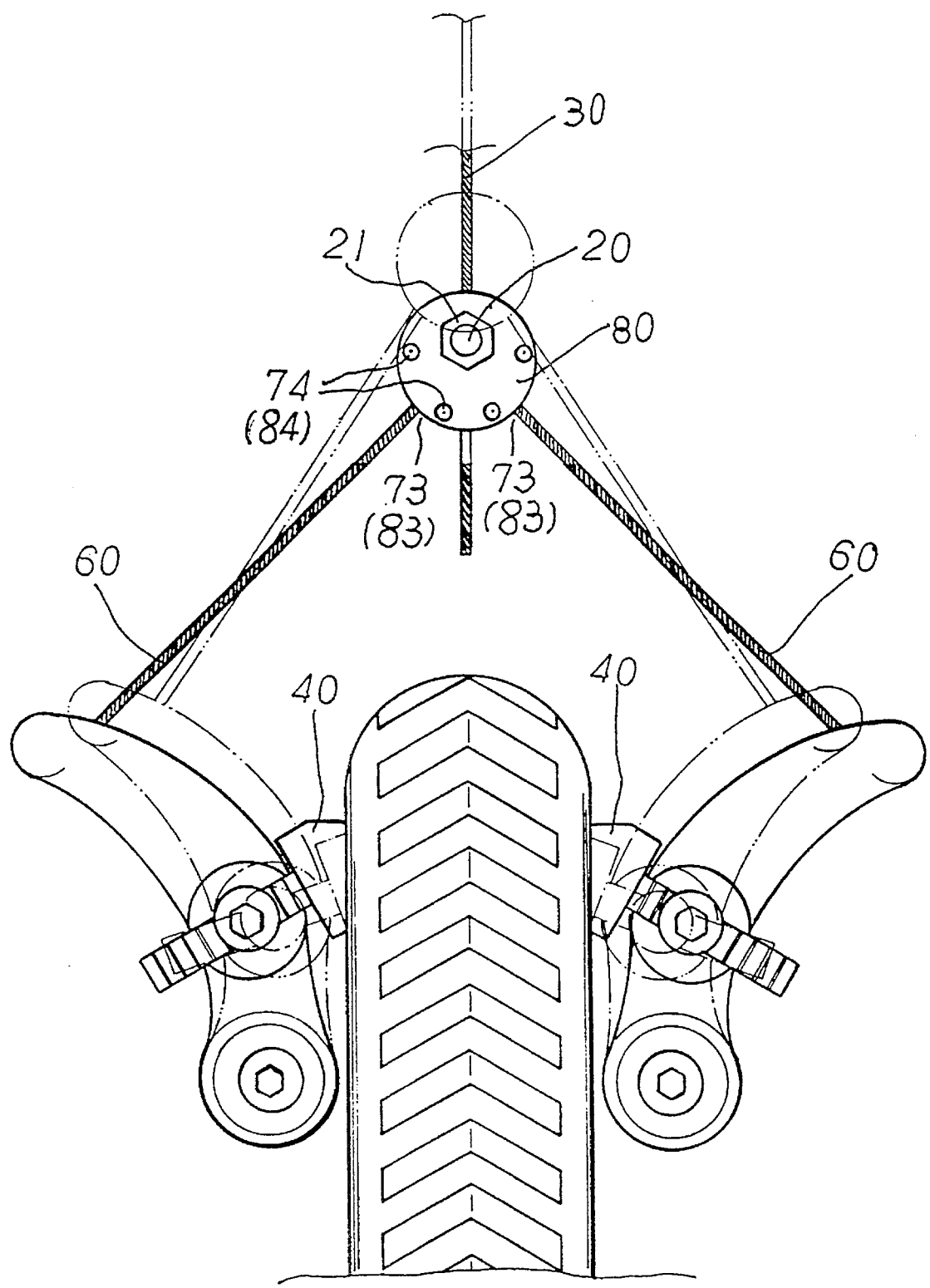
FIG. 7 shows that the brake cord of the present invention is pulled to drive the hanging cords and the brake blocks.

Please refer to FIG. 7. When the brake cord 30 is pulled to drive the brake block assembly 40 for braking, the hanging cords 60 can sufficiently swing within the left and right notches 73, 3 of the seat member 70 and cover member 80 without being tensioned. In addition, the hanging cords 60 are securely hung on the hanging apparatus without departing therefrom.

The above embodiment is only an example of the present invention and the scope of the present invention should not be limited to the example. Any modification or variation derived from the example should fall within the scope of the present invention.

What is claimed is:

1. A hanging apparatus for a brake cord of a bicycle, an end of the brake cord being securely connected with said hanging apparatus and two hanging cords being connected between said hanging apparatus and two brake blocks, said brake cord being able to pull Said hanging apparatus to synchronously pull the hanging cords so as to drive the brake blocks to move toward each other for frictionally contacting with a rim of a wheel to brake the bicycle, said hanging apparatus comprising:.

two circular metal plates each having a middle bent sections a lower section formed with two circular holes. and an upper section formed with an elliptic hole the upper section of the metal plate being formed with a semicircular channel above the elliptic hole, whereby when the two metal plates are attached to each other the channels together form a circular socket having a diameter slightly smaller than that of a brake cord, two hanging heads of the hanging cords capable of being positioned in the circular holes of the metal plates, whereby when the metal plates are attached to each other, the hanging cords are adapted to be clamped therebetween;

a seat member receiving the metal plates and formed with an elliptic hole and a peripheral flange disposed with upper and lower notches and left and right notches, a diameter of each notch being slightly larger than that of either of the hanging cords, whereby the hanging cords could be capable of passing through the left and right notches Of the flange of the seat member; and a cover member overlaid on the seat member, the cover member being formed with an elliptic hole and a peripheral flange formed with upper and lower notches and left and right notches, several engaging posts being disposed on the flange of the seat member and several engaging orifices being formed on the flange of the cover member, whereby the engaging posts can be inserted into the engaging orifices so as to engage the cover member with the seat member and clamp the metal plates and the hanging heads therebetween with the hanging cords passing through the notches of the seat member and cover member, a stepped bolt having an elliptic large diameter section and a threaded small diameter section being passed through a rubber washer, the elliptic holes of the seat member, metal plates and cover member, the threaded section of the bolt being tightened by a nut, a through hole being formed on the large diameter section of the bolt in allignment with the circular socket of the metal plates, whereby the brake cord can pass through the upper notches of the seat member and cover member, the circular socket of the metal plates, the through hole of the bolt and a clearance between the lower sections of the metal plates and the lower notches of the seat member and cover member, the bolt being tightened by the nut and adapted to be able to pull the brake cord, the seat member and cover member being engaged with each other to compress the circular socket of the metal plates and adapter to bind the brake cord therein without loosening therefrom, the hanging cords adapted to be sufficiently swingable within the left and right notches of the seat member and cover member without being tensioned during braking operation.

\* \* \* \* \*